United States Patent
Rolland et al.

(10) Patent No.: US 7,119,965 B1
(45) Date of Patent: Oct. 10, 2006

(54) HEAD MOUNTED PROJECTION DISPLAY WITH A WIDE FIELD OF VIEW

(75) Inventors: Jannick Rolland, Orlando, FL (US); Yonggang Ha, Orlando, FL (US); Larry D. Davis, Jr., Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 10/783,178

(22) Filed: Feb. 20, 2004

Related U.S. Application Data

(60) Provisional application No. 60/449,722, filed on Feb. 24, 2003.

(51) Int. Cl.
*G02B 27/14* (2006.01)
*G09G 5/00* (2006.01)

(52) U.S. Cl. .......................................... 359/630; 345/7

(58) Field of Classification Search ................... 359/13, 359/14, 19, 23, 458, 630–634, 636–638; 348/115; 353/7, 10, 13, 99; 349/11; 345/7, 345/8

See application file for complete search history.

(56) References Cited

U.S. PATENT DOCUMENTS

| | | | | |
|---|---|---|---|---|
| 4,669,810 A | | 6/1987 | Wood ........................... | 350/3.7 |
| 4,753,522 A | | 6/1988 | Nishina et al. .............. | 350/470 |
| 4,863,251 A | | 9/1989 | Herloski ...................... | 350/471 |
| 5,172,272 A | | 12/1992 | Aoki ........................... | 359/654 |
| 5,172,275 A | | 12/1992 | DeJager ....................... | 359/755 |
| 5,418,584 A | * | 5/1995 | Larson ......................... | 359/634 |
| 5,526,183 A | | 6/1996 | Chen ........................... | 359/629 |
| 5,572,229 A | * | 11/1996 | Fisher ........................... | 345/8 |
| 5,621,572 A | | 4/1997 | Fergason ..................... | 359/630 |
| 5,625,495 A | | 4/1997 | Moskovich .................. | 359/663 |
| 5,818,632 A | | 10/1998 | Stephenson ................. | 359/565 |
| 6,028,606 A | | 2/2000 | Kolb et al. .................. | 345/419 |
| 6,097,543 A | * | 8/2000 | Rallison et al. ............. | 359/633 |
| 6,198,577 B1 | | 3/2001 | Kedar et al. ................. | 359/663 |
| 6,271,972 B1 | | 8/2001 | Kedar et al. ................. | 359/663 |
| 6,301,062 B1 | | 10/2001 | Ohmori et al. ............. | 359/733 |
| 6,404,562 B1 | | 6/2002 | Ota et al. ..................... | 359/692 |
| 6,543,899 B1 | * | 4/2003 | Covannon et al. .......... | 359/630 |
| 2003/0137731 A1 | * | 7/2003 | Takahashi et al. .......... | 359/462 |

OTHER PUBLICATIONS

"An Ultra-Light and Compact Design and Implementation of Head-Mounted Projective Displays," Hong Hua, et al., 2001, pp. 175-182.

(Continued)

*Primary Examiner*—Alicia M Harrington
(74) *Attorney, Agent, or Firm*—Brian S. Steinberger; Law Offices of Brian S. Steinberger, P.A.

(57) ABSTRACT

A ultra-wide field of view head mounted display has been realized by integrating an ARC display component having a greater than about 70 degrees field of retro-reflection with an optical tiling display which provides a greater than about 80 degrees horizontal field of view by about 50 degrees vertical field of view whereby an overall binocular horizontal field of view greater than about 120 degrees is realized with a greater resolution than about 2 arc minutes. There is also taught a method of providing a wide field of view head mounted display by the steps of: combining an ARC display component and an optical tiling display; and, integrating said component and said tiling display whereby an overall field of view greater than about 120 degrees is realized.

19 Claims, 4 Drawing Sheets

OTHER PUBLICATIONS

"*Innovative Diffractive Eyepiece for Helmet-Mounted Display,*" J. Bunkenburg, Jul. 1998, pp. 41-49.

"*Diffractive Apochromatic Double-Gauss Lens,*" Hideki Ogawa, Oct. 1999, pp. 43-45.

* cited by examiner

Fig.3a
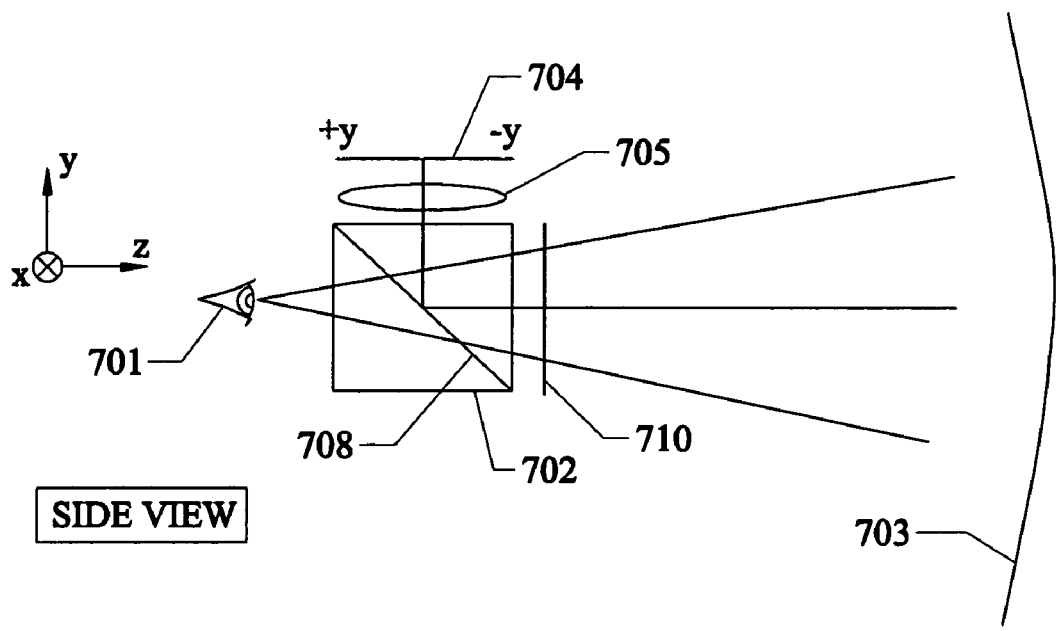
SIDE VIEW
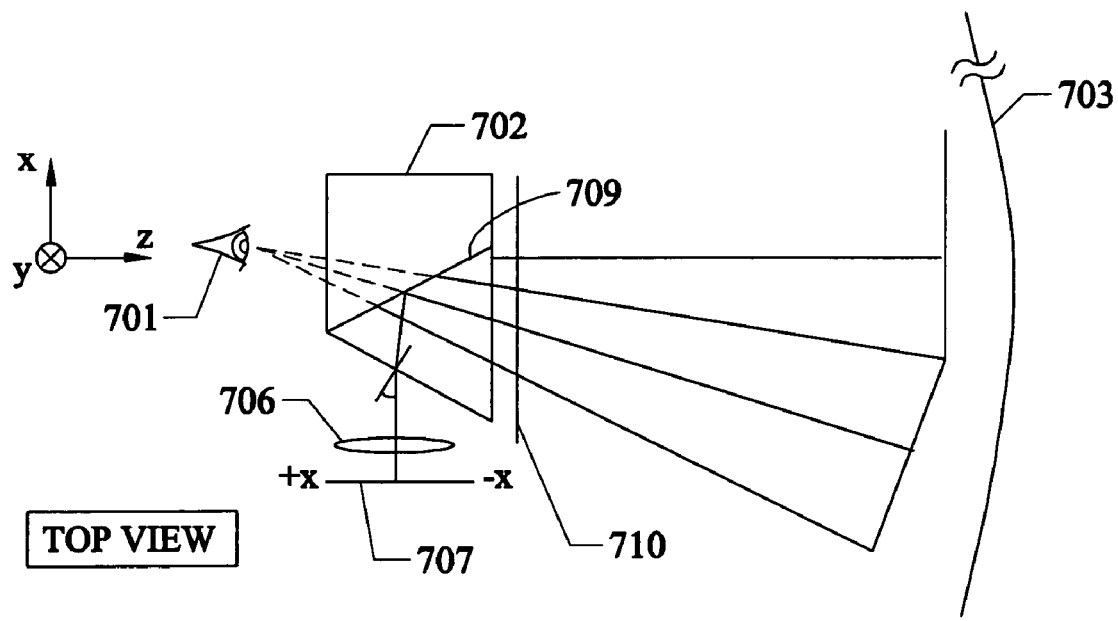
TOP VIEW
Fig.3b

HEAD MOUNTED PROJECTION DISPLAY WITH A WIDE FIELD OF VIEW

This invention claims the benefit of priority to U.S. Provisional Patent Application 60/449,722 filed Feb. 24, 2003 and has been funded in part from contracts ONR/VIRTE N00140210261 and ONR/VIRTE STTR N00014-02-M-0229.

FIELD OF INVENTION

This invention relates to a head mounted projection display (HMPD), and in particular to a HMPD based on the integration of an Artificial Reality Center (ARC) display component and an optical tiling head mounted display (HMD), whereby a wide field of view is realized, and a method of providing a wide field of view to a head mounted display.

BACKGROUND AND PRIOR ART

Networked virtual environments allow users at remote locations to use a telecommunication link to coordinate work and social interaction. Teleconferencing systems and virtual environments that use 3D computer graphics displays and digital video recording systems allow remote users to interact with each other, to view virtual work objects such as text, engineering models, medical models, play environments and other forms of digital data, and to view each other's physical environment.

A number of teleconferencing technologies support collaborative virtual environments which allow interaction between individuals in local and remote sites. For example, video-teleconferencing systems use simple video screens and wide screen displays to allow interaction between individuals in local and remote sites. However, wide screen displays are disadvantageous because virtual 3D objects presented on the screen are not blended into the environment of the room of the users. In such an environment, local users cannot have a virtual object between them. This problem applies to representation of remote users as well. The location of the remote participants cannot be anywhere in the room or the space around the user, but is restricted to the screen.

Head-mounted displays (HMDs) have been widely used for 3D visualization tasks such as surgical planning, medical training, or engineering design. The main issues of the conventional eyepiece-based HMD technology include tradeoffs between resolution and field-of-view (FOV), and between compactness and eye clearance, the presence of large distortion for wide FOV designs, the conflict of accommodation and convergence, the occlusion contradiction between virtual and real objects, the challenge of highly precise registration, and often the brightness conflict with bright background illumination. The concept of head-mounted projective displays (HMPDs) is an emerging technology that can be thought to lie on the boundary of conventional HMDs, and projective displays such as the CAVE technology.

The basic HMPD concept of projection head-mounted display was first patented by Fisher Nov. 5, 1996, in U.S. Pat. No. 5,572,229. On Apr. 15, 1997, a U.S. Pat. No. 5,621,572 was also issued to Ferguson on the conceptual idea of a display, i.e. optical, system for head mounted display using retro-reflector and method of displaying an image.

Common to all teleconferencing systems is the use of lenses of various configurations and weights with distortions, lack of clarity and smearing of the televised images. Representative of lenses that might at first glance appear to be useful in the teleconferencing systems are also shown in:

U.S. Pat. No. 5,526,183 by Chen who teaches the use of a lens combining diffractive elements of both glass and plastics to reduce the weight and size of the lens which lens within a conventional helmet mounted display;

U.S. Pat. No. 5,173,272 by Aoki which discloses a four element high aperture lens with glass elements making it too heavy for helmet mounting;

U.S. Pat. No. 4,753,522 by Nishina et al which lens features all 4 plastic elements and is fully symmetrical which latter property is imposed by its restricted application—a copy machine lens; and, U.S. Pat. No. 4,669,810 by Wood which shows a head-mounted display with many (more than 4) optical elements in the relay optics.

There is a need for a HMPD reality display that mitigates the above mentioned disadvantages and has the capability to provide a widened field of view (FOV), i.e., greater than 120 degrees. Lightweight and compactness are always of basic importance and/or highly desirable for head-mounted devices but of even greater importance is those that display a wider FOV with high resolution.

SUMMARY OF THE INVENTION

A first objective of the present invention is to provide a head mounted projection display (HMPD) and method of enhanced field of view.

A second objective of this invention is to provide a HMPD and method of enhanced field of view with high resolution.

A third objective of this invention is to provide a HMPD and method having a field of view greater than about 120 degrees.

Another objective of this invention is to provide a HMD and method having a field of view greater than about 120 degrees and a resolution of greater than about 2 arc min.

A preferred embodiment of the invention encompasses a head mounted projection display (HMPD) and method of providing a wide field of view having an ARC display component having a greater than about 70 degrees field of retro-reflection integrated with an optical tiling display which provides a greater than about 80 degrees FOV per eye whereby an overall binocular FOV greater than about 120 degrees is realized.

Further objects and advantages of this invention will be apparent from the following detailed description of the presently preferred embodiments which are illustrated schematically in the accompanying drawings.

BRIEF DESCRIPTION OF THE FIGURES

FIGS. 3(a), 3(b) and 3(c) provide cross-sectional side views and overhead view, respectively, of the optical tiling display which is integrated with the ARC display component to provide the novel HMPD.

DESCRIPTION OF THE PREFERRED EMBODIMENTS

Before explaining the disclosed embodiment of the present invention in detail, it is to be understood that the invention is not limited in its applications to the details of the particular arrangements shown since the invention is capable of other embodiments. Also, the terminology used herein is for the purpose of description and not of limitation.

It would be useful to discuss the meanings of some words used herein and their applications before discussing the compact lens assembly of the invention including:

HMPD—helmet mounted projection display;

ARC display—an artificial reality center, composed of a curved retro-reflective screen for HMPD, the curved screen can span up to 360 degrees;

EFL—effective focal length;

$F^\#$—f-number;

OAL—overall length;

FOV—field of view (given in degrees for the diagonal of the display);

EPD—entrance pupil diameter; and,

Tiling display—A display consists of multiple sub-displays tiled together

Figure 1A:
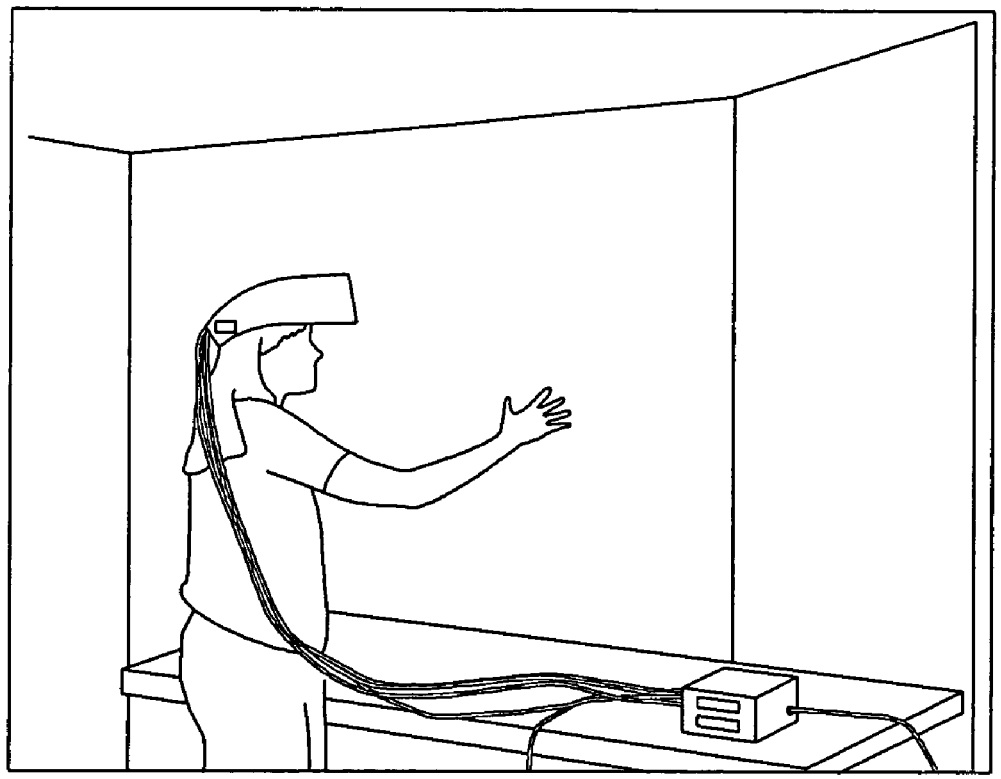
FIG. 1(a) provides an illustrative view of the ARC display component of the novel Head Mounted Device (HMPD).
Figure 1B:
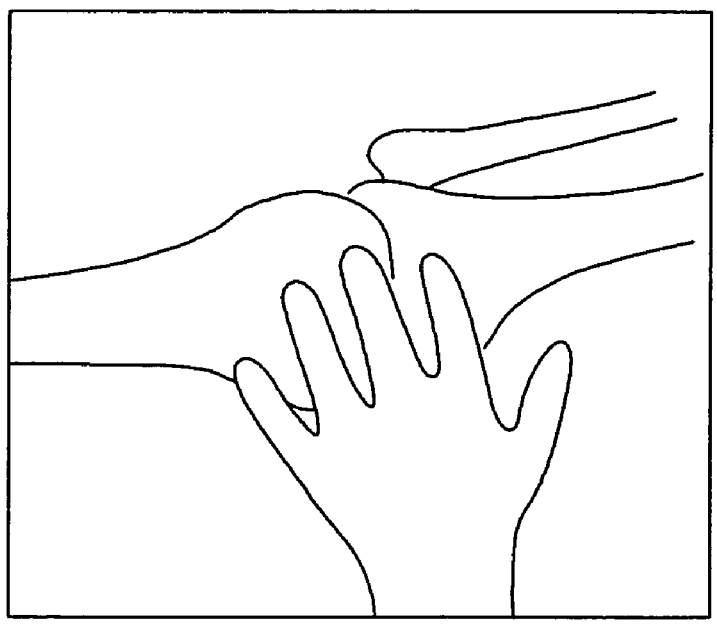
FIG. 1(b) shows a view of a real hand holding a virtual 3D model of a human bone seen in the ARC display.

Referring now to FIG. 1, there is pictorially illustrated a view of the HMPD ARC component in use, FIG. 1(a) and a single view, FIG. 1(b) of the view of a real hand providing the 3D model of a human bone seen in the display. The ARC display screen can be utilized with any compact lens of low weight and having a wide FOV and good resolution. Two types of this preferable kind of lenses are disclosed in the succeeding two paragraphs.

For use in a HMPD, the weight of the lens, its FOV, its lack of smear and high resolution are of extreme importance. A highly useful lens for HMPD applications is disclosed in co-pending U.S. patent application Ser. No. 10/090,070 filed Mar. 1, 2002 and of common assignee with the instant invention and fully incorporated herein by reference thereto, to be a double-Gauss lens which has a FOV of about 52 degrees with an effective focal length of 35 mm. The specification of the preferred compact lens system which is mounted in the HMPD of FIG. 1 is: EFL=35 mm; $F^\#$=2.9167; OAL=15.8755 mm; FOV=52.40; EPD=12 mm; weight<8 g.

An extremely useful compact lens of reduced weight and exceptional suitability for HMPD with a FOV greater than approximately 70 degrees is the subject matter of U.S. patent application Ser. No. 10/285,855 which was filed in November 2002 and of common assignee with the instant Application and fully incorporated herein by reference thereto and disclosed therein to be a double-Gauss plastic-glass lens with an effective focal length of 23.92 mm. The specification of the preferred compact lens system for mounting in the HMPD has the following characteristics: EFL=23.92 mm; $F^\#$=2.39; OAL=13.36 mm; FOV=70.0°; EPD=10 mm; weight=6.0 g.

The ARC display component is made of a large retro-reflective screen warped on a curved surface, which can extend up to 360 deg. around a set of users, to display 3 D images/objects in a large field of view provided by the head mounted projection displays worn by the users (HMPD). For the current retro-reflective material, there is a limitation of about ±35° (70°) angle limitation i.e. 70° about for reflective rays hitting a flat retro-reflective screen. With the help of the ARC screen which is curved, one can go beyond 70° field of retro-reflection and present 3D images/objects with our novel HMPD.

FIG. 1(a) shows a typical configuration of an ARC display component. The display is about 2.5 meters high with a cylindrical radius about 2 meters. The span of the shown ARC display component can cover about 120 degrees for the user standing around in the center. Considering the nature of the retro-reflective screen, the distance from the retro-reflective screen or the ARC display component is independent from the distance of the projected images. The distance from the HMPD to the ARC display component can be at least greater than approximately ½ meter apart, but can vary according to the application of the system. The ARC display component can either be remote to the HMPD or even be attached to the HMPD to form an immersive non-see-through system. When the ARC display is attached closely within 100 mm to the HMPD, a compact lens, preferably, a Fresnel lens is necessary to be located between the ARC display component and the HMPD to match the pixel size of the projected image to the pixel size of the retroreflective material on the ARC display. The surface of the ARC display component can either be a cylindrical surface or other curved surface as long as it provides high efficiency of retro-reflection across the whole field of view. Referring to FIG. 1 (b), it shows a view of a real hand holding a virtual 3D model of a human bone seen in the ARC display. It shows that the HMPD can provide right occlusion of real objects over virtual 3D objects in the visual space.

Figure 2:
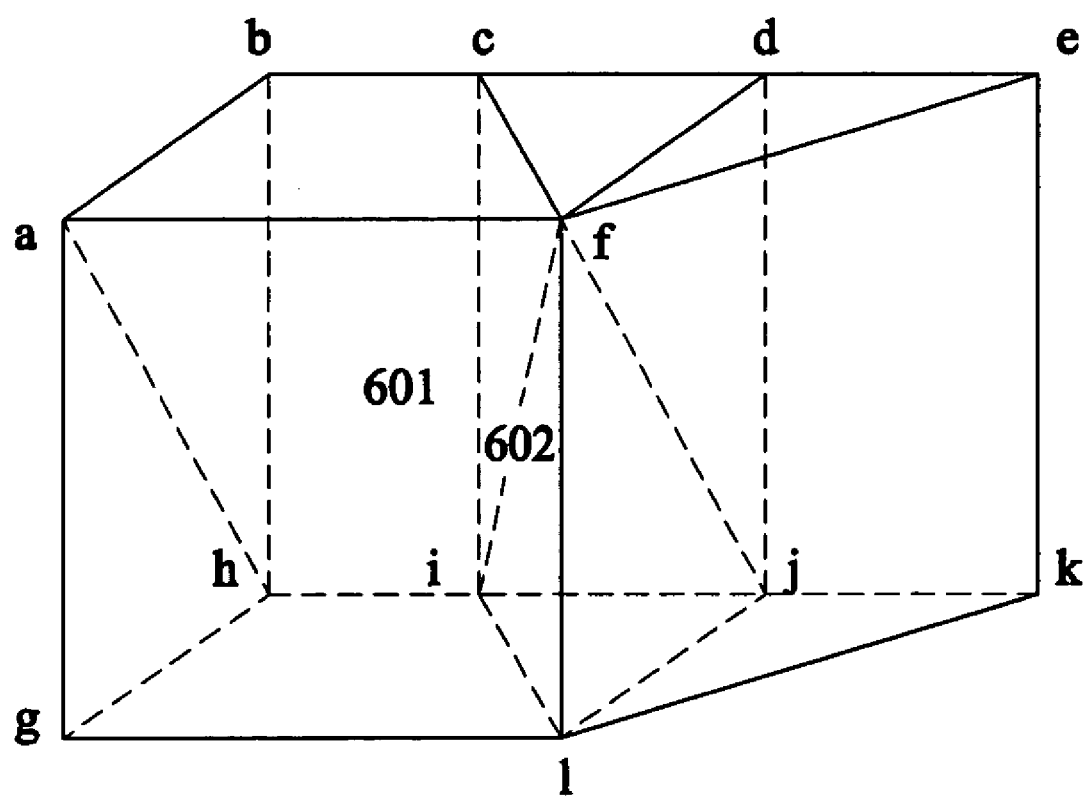
FIG. 2 provides the perspective view of the optical tiling component, i.e. the space x-prism, which combines two separate projection lenses to achieve the aft-projection optical tiling.

It is in FIG. 2 that the perspective view of the optical tiling component of the HMPD of the invention is seen. The tiling component is a space x-prism consisting of a cube and a wedge. Vertexes of the components are listed from "a" to "l" in FIG. 2. The inner surfaces 601 (enclosed by the vertexes a, f, j and h) and 602 (enclosed by the vertexes c, f, l and i) are two half mirror surfaces which reflect the rays from the top and side respectively. The purpose of the optical wedge is to deflect the chief rays from the side projection lens to achieve optical tiling in the horizontal direction.

Figure 3C:
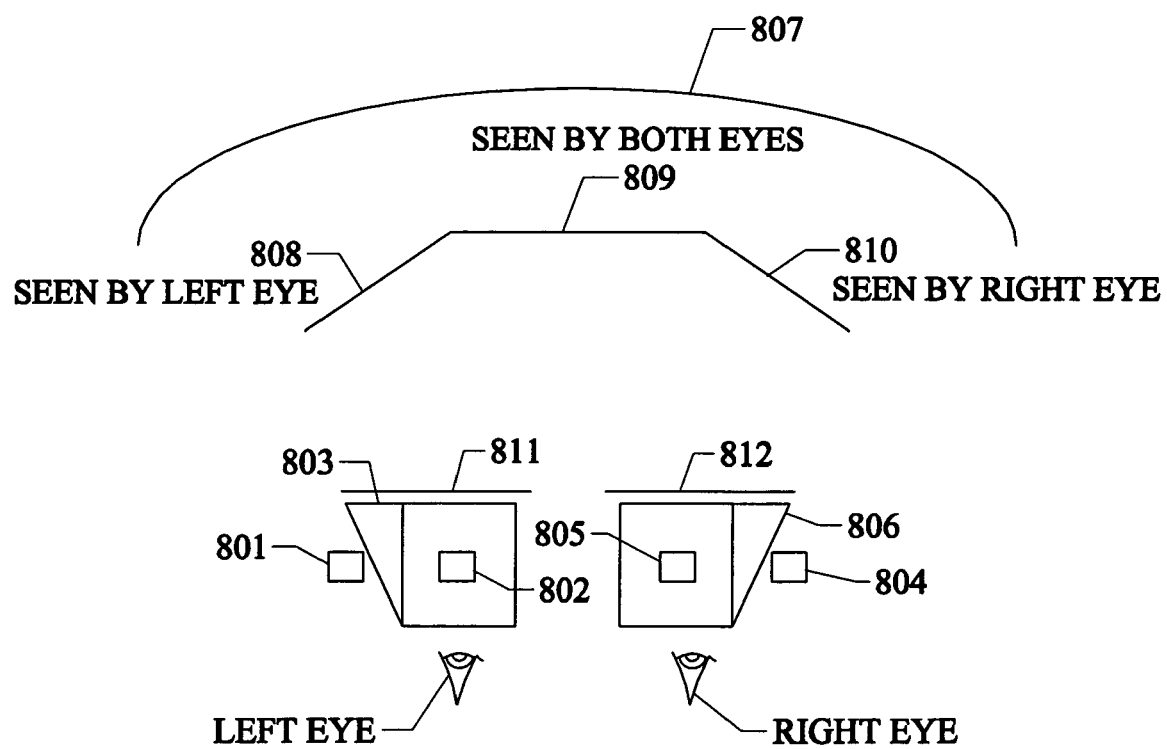

FIG. 3 provides a configuration that folds the optical path after the projection optics. This is referred to aft-projection folding as opposed to first folding and then projection. FIG. 3 further shows the aft-projection folding cross sectional illustrative views and the detailed configuration of the optical tiling HMPD. FIG. 3 (a) is a side view of the system for the right eye of the user while FIG. 3 (b) is a cross sectional view from the top for the same system for the right eye of the user. It consists of two separate projection lenses. One of the projection lenses is mounted at the top of the space x-prism 702 (customer designed) and consists of a miniature display 704 (exemplified by SXGA-R2-H2 purchased from CRL Opto Ltd.) and a compact projection lens 705 (exemplified by the lens of U.S. patent application Ser. No. 10/090,070, the same assignee which is incorporated by reference). With the half mirror 708 (exemplified by "Acrylic BM" purchased from Evaporated Coating Inc) inside the space x-prism 702, the image of the miniature display is projected in front of the user's eye 701 at an appropriate distance.

As shown in FIG. 3 (b), another separate projection, which consists of miniature display 707 (exemplified by SXGA-R2-H2 purchased from CRL Opto Ltd.) and a compact projection lens 706 (exemplified by the lens of U.S. patent application Ser. No. 10/090,070 by the same assignee which is incorporated by reference), is mounted on the side of the x-prism 702. With the help of the inner half mirror surface 709 and the optical wedge in the x-prism, the image of the miniature display 707 (exemplified by SXGA-R2-H2 purchased from CRL Opto Ltd.) is projected towards the right side of the user and tiled with the image projected from the top projection lens. FIG. 3 is the ARC display component mantled with retro-reflective material that will retro-reflect all the light back to the user's eye 701. Per nature of the retro-reflective material, the ARC display component 703 (whose panels are custom laminated, but the structure holding the panels is exemplified by a "250 pop-up system" purchased from Trade Show Supply Inc.) can be placed at any distance around the projected image. The half mirror surfaces 708 and 709 correspond to the surfaces 601 and 602 in FIG. 2. The line 710 in FIG. 3 (*a*) and FIG. 3 (*b*) represents a Fresnel lens discussed before. It is only necessary if the ARC display is closely attached to the HMPD.

The optical tiling system for the left eye of the user has the symmetrical settings in the configuration shown in FIGS. 3 (*a*) and 3 (*b*). FIG. 3 (*c*) is a top view of an optical tiling HMPD system with both right and left tiling displays. For the left eye system, the top projection lens 802 and side projection lens 801 project images through the x-prism 803 (customer designed) and the projected images are 809 and 808, respectively. For the right eye system, the top projection lens 805 and side projection lens 804 project images through the x-prism 806 (customer designed) and the projected images are 809 and 810, respectively. With the help of the retro-reflective material on the ARC display component 807 all the light projected from the projection lenses 801 and 802 will be retro-reflected to the left eye of the user, and all the light projected from the projection lenses 804 and 805 will be retro-reflected to the right eye.

The images projected from 801 and 805 are superimposed in visual space at surface 809. Each projection lens in FIG. 3 (*c*) has a vertical FOV of about 50 degrees and horizontal FOV of about 40 degrees. In this way, the optical tiling HMPD of the horizontal FOV of about 120 degrees and the vertical FOV of about 50 degrees is achieved. As one adjusts the field of view of each projection lens in FIG. 3 (*c*), other fields of view which bigger or smaller than about 120 degrees can be achieved. As early described, the Fresnel lenses 811 and 812 can be introduced when the ARC display is attached closed within 100 mm to the HMPD to form an immersive system.

The head-mounted projecting display (HMD) can be based on novel innovative technology of integrating the ARC display component with an optical tiling component to realize a field of view in excess of about 120 degrees with excellent resolution. The optical tiling component, i.e. the space x-prism, provides a FOV greater than about 70 degrees. The ARC component provides a curved display that can be either remote or clip on to the helmet allowing a greater than about +/−35 degrees retroreflective angle. The novel HMPD of the invention has the property of a resolution of about 2.3 arc minutes at the eye and demonstrates a FOV of about 120 degrees horizontal and about 50 degrees vertical FOV. Furthermore this novel HMPD has the dual capability for both immersive and see-through applications.

Applications of this disclosed invention are many including use for the military both in training and combat, entertainment, training of medical personnel, and also in a science such as geophysics, and the like, where three dimensional viewing is desired.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of providing a wide field of view (FOV) to a head mounted display comprising the steps of:
    (a) combining an Artificial Reality Center (ARC) display component and an optical tiling component; and,
    (b) integrating said display component and said optical tiling component produce a left projected image and a right projected image said integrating step comprising:
        providing optical tiling component for a left eye of the user; and
        providing optical tiling component for a right eye of the user, wherein said optical tiling for the left eye and said optical tiling for said right eye provides an overall binocular field of view (FOV) greater than about 80 degrees is realized from the left projected image tiled with the right projected image.

2. The method of claim 1 whereby an overall binocular FOV greater than about 120 degrees is realized.

3. The method of claim 1 wherein the combining step also includes a compact lens when the distance between the ARC display component and said optical tiling component is less than approximately 150 mm.

4. The method of claim 3 wherein said compact lens is a Fresnel lens.

5. The method of claim 1 wherein said integrating step further includes:
    projecting a left and a right top image; and
    projecting a left and a right side image, wherein said left and said right top image is tiled with a corresponding one of said left and said right side image to produce a left and a right tiled optical image.

6. The method of claim 5 wherein said left and said right tiled optical image overlap.

7. The method of claim 1, wherein said optical tiling for the left eye and said optical tiling for said right eye provides said overall binocular horizontal FOV greater than approximately 120 degrees.

8. An optical projection system comprising:
    an optical tiling system for producing a tiled projected image, wherein said optical tiling component comprises:
        a side projection system for projecting a side image;
        a top projection system for projecting a top image; and
        an optical tiling component having an optical cube and an optical wedge connected with said optical cube for receiving said side image and said top image, wherein said optical cube and said optical wedge reflect said side image and said top image.

9. The system of claim 8 wherein said optical wedge deflects said side image to achieve optical tiling in a horizontal direction.

10. The system of claim 8 wherein said optical tiling system includes:
    a left and a right optical tiling system for producing a left and a right tiled projected image, wherein said left and said right tiled projected image covers a greater than approximately 80 degrees field of view per side.

11. The system of claim 10 wherein said left and said right tiled projected image overlap to provide said tiled projected image covering a horizontal field of view greater than approximately 70 degrees.

12. The system of claim 11 wherein the overlapped left and right tiled projected optical image provide greater than approximately 50 degree vertical field of view.

13. The system of claim 10 wherein each of said left and said right optical tiling system comprise:
- a side projector for projecting a side image;
- a top projector for projecting a top image; and
- an optical tiling component for receiving and reflecting said side image and said top image to produce said tiled projected image at said reflective surface for viewing.

14. The system of claim 13 wherein said tiled projected optical image covers greater than approximately 120 degree horizontal field of view.

15. The system of claim 8, wherein said retroreflective surface is an Artificial Reality Center (ARC) display component having a greater than approximately 70 degrees field of retroreflection.

16. The system of claim 15 wherein said ARC display component is located at a distance greater than approximately one-half meter from said optical tiling system.

17. The system of claim 15 wherein the optical projection system is used with a helmet to provide a head mounted projection display.

18. The system of claim 17 wherein said ARC display component is located at a distance approximately 100 mm from the head mounted projection display, said system including:
- a compact lens located between said optical projection system and said retroreflective surface.

19. A head mounted projection display (HMPD) comprising:
- an optical tiling system for producing and tiling a left and a right projected image to produce a tiled projected image, wherein the optical tiling system includes a left and a right optical tiling system comprising:
  - a top projection system for projecting a top image;
  - a side projection system for projecting a side image; and
  - an optical tiling component for receiving and reflecting said top and said side image to produce said tiled projected image; and
- an artificial reality center display having a greater than approximately 70 degrees field of retroreflection for receiving and retro-reflecting said tiled projected image to a user.

* * * * *